(12) United States Patent
Juan

(10) Patent No.: US 6,239,967 B1
(45) Date of Patent: May 29, 2001

(54) ELECTRONIC ASSEMBLY INCLUDING AN ELECTRONIC UNIT CONNECTED TO A COIL

(75) Inventor: Alain Juan, Chézard (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 09/155,894

(22) PCT Filed: Apr. 21, 1997

(86) PCT No.: PCT/CH97/00160

§ 371 Date: Oct. 8, 1999

§ 102(e) Date: Oct. 8, 1999

(87) PCT Pub. No.: WO97/40469

PCT Pub. Date: Oct. 30, 1997

(30) Foreign Application Priority Data

Apr. 22, 1996 (FR) .................................................. 96 05017

(51) Int. Cl.⁷ ..................................................... H01F 15/02
(52) U.S. Cl. ........................... 361/622; 336/192; 361/767
(58) Field of Search ........................... 336/96, 192, 208; 174/52.2; 361/760, 767, 600, 601, 622, 728

(56) References Cited

U.S. PATENT DOCUMENTS

| | | | |
|---|---|---|---|
| 3,697,817 | * | 10/1972 | Yongue . |
| 3,824,518 | * | 7/1974 | Slenker . |
| 4,400,674 | * | 8/1983 | Suda . |
| 4,999,742 | * | 3/1991 | Stampfli . |

FOREIGN PATENT DOCUMENTS

| | | |
|---|---|---|
| 44 31 604 | 3/1996 | (DE) . |
| 0 376 062 | 7/1990 | (EP) . |
| 0 708 414 A2 | 4/1996 | (EP) . |

* cited by examiner

*Primary Examiner*—Gerald Tolin
(74) *Attorney, Agent, or Firm*—Griffin & Szipl, P.C.

(57) ABSTRACT

The electronic assembly (20) includes an electronic unit (24), formed of an electronic module (26) and two conductive tongues (28, 30) defining two electric contact pads of said electronic unit, and a coil (22). The body (40) of the coil (22) is partially superposed onto the two tongues and fixed to the latter in a durable manner by means of a solidified binder material. The two ends of the coil are bonded respectively onto the two tongues (28, 30).

13 Claims, 4 Drawing Sheets

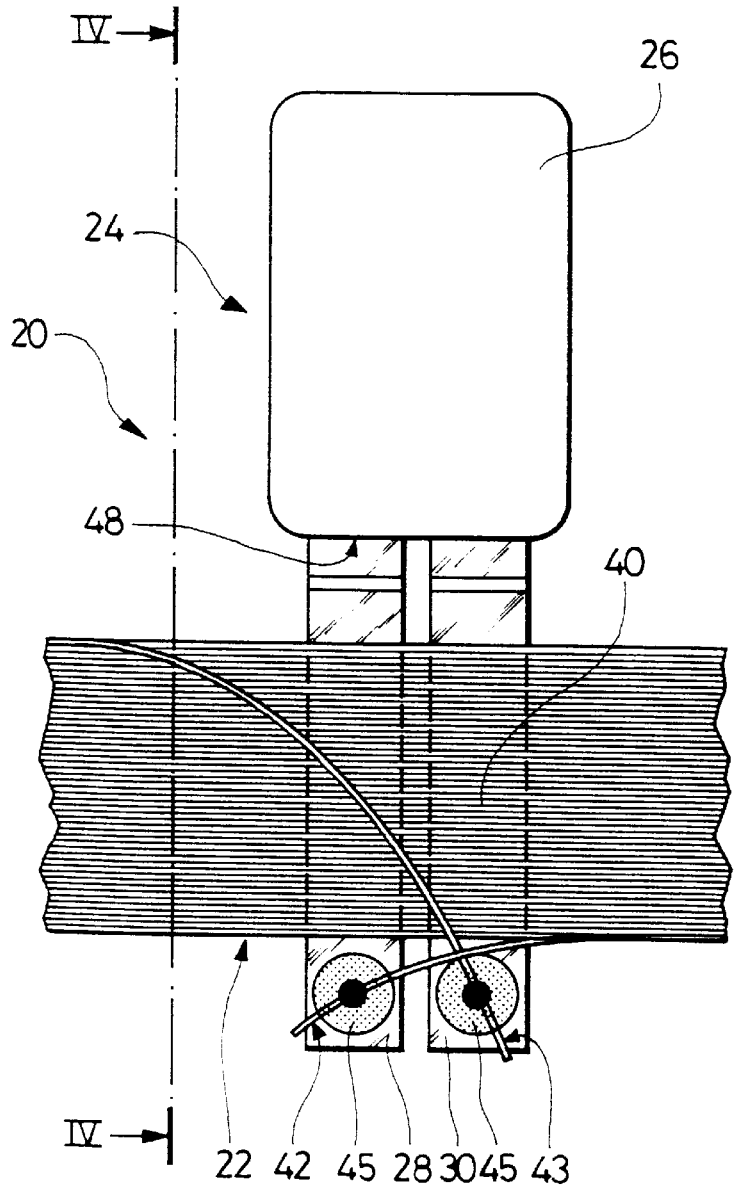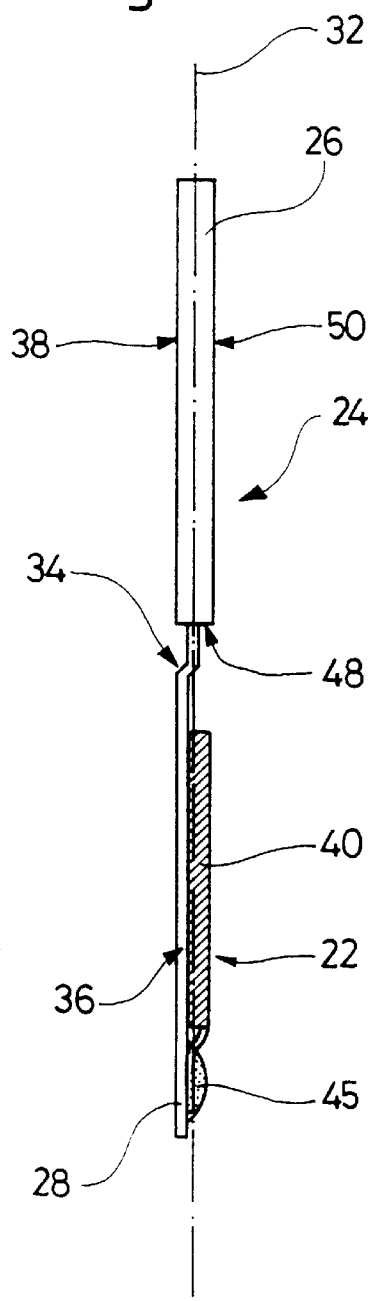

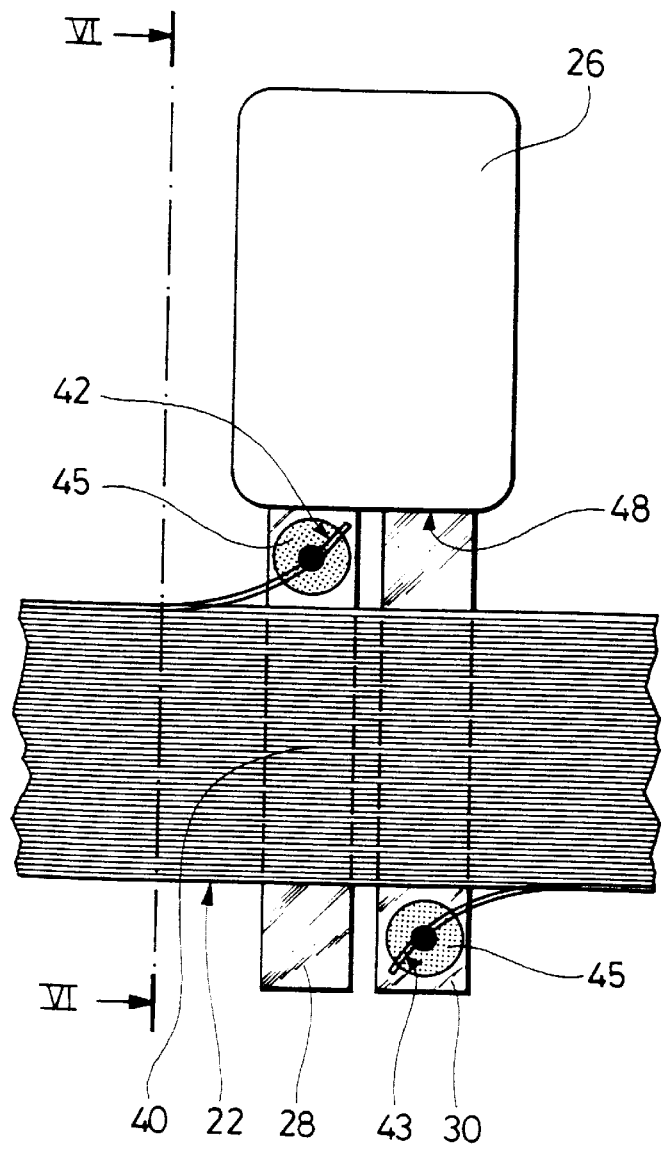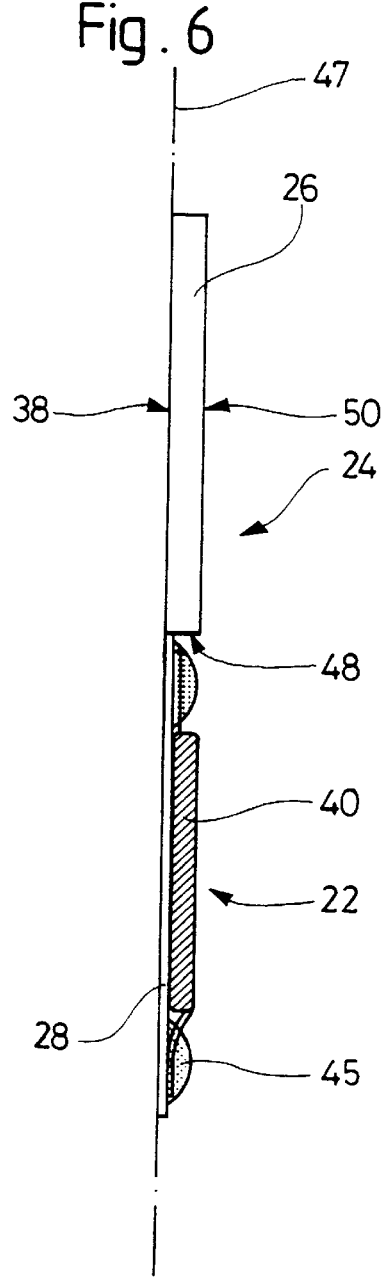

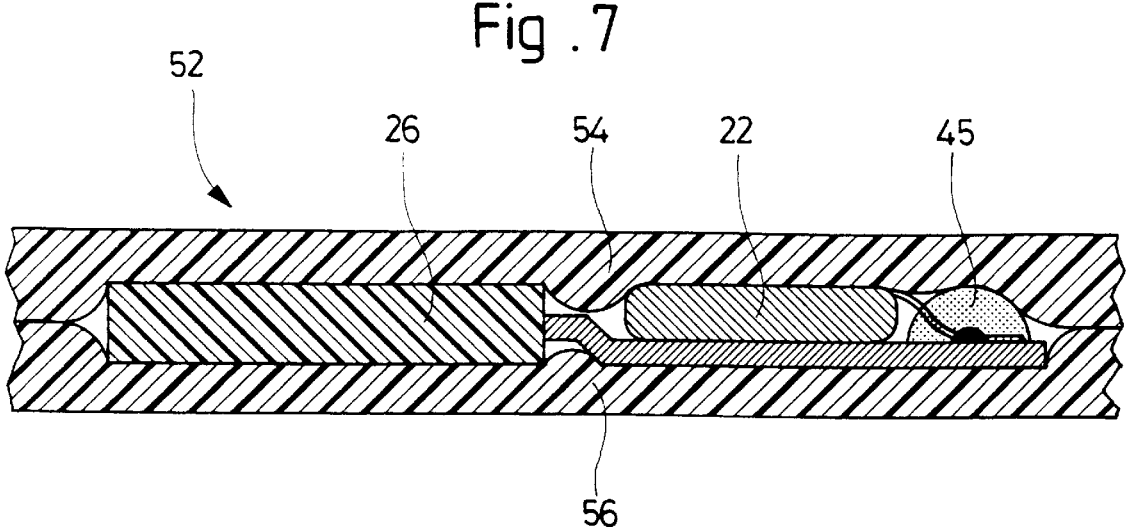
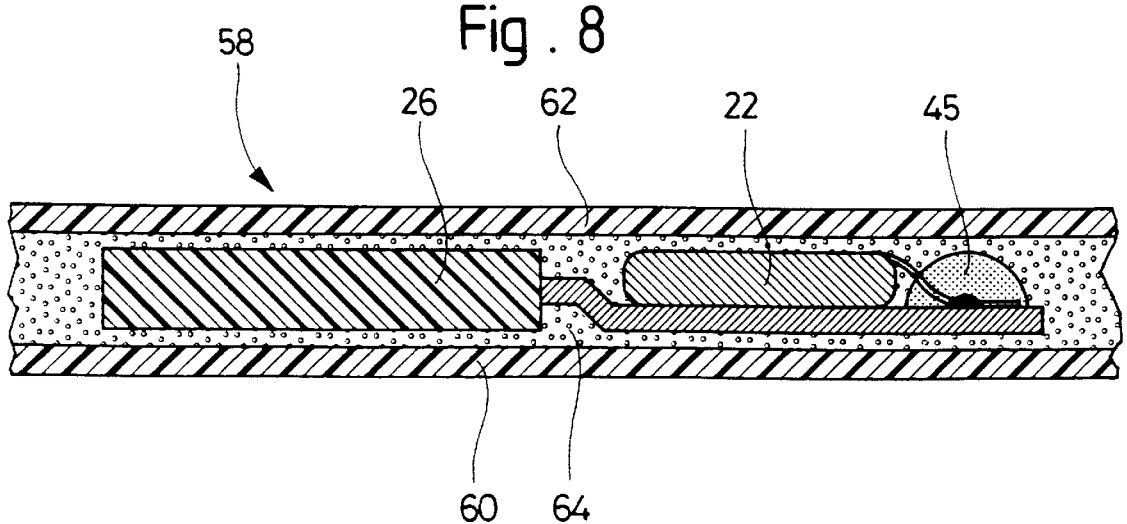

ELECTRONIC ASSEMBLY INCLUDING AN ELECTRONIC UNIT CONNECTED TO A COIL

FIELD OF THE INVENTION

The present invention concerns an electronic assembly formed by an electronic unit including two electric contact pads and by a coil both ends of which are electrically connected to the two electric contact pads.

BACKGROUND OF THE INVENTION

An assembly of this type known to those skilled in the art is shown in FIG. 1. In said FIG. 1, the electronic assembly 2 includes a coil 4 and an electronic module 6 arranged on a substrate 8. Module 6 has two electric contact pads 10 and 11, which are respectively electrically connected to two electric contact pads 12 and 13, arranged on substrate 8, by means of two electric connecting wires 15 and 16. The electric connection between electronic module 6 and coil 4 is thus achieved by means of first electric contact pads provided on module 6 and connected by two conductive metal wires to electric contact pads arranged on substrate 8. The two wires 15 and 16 are generally protected by an adhesive material deposited after bonding of said electric connecting wires.

In order to assure the cohesion of electronic assembly 2, coil 4, more particularly the body 18 of said coil superposed onto substrate 8, is bonded to said substrate 8. Thus, electronic module 6 is attached to coil 4 and fixedly held thereto via substrate 8.

It is necessary for such an electronic assembly that the electronic module is properly fixed to the coil so that this electronic assembly is not damaged during prehension or manipulation of this electronic assembly.

Electronic assembly 2 described hereinbefore with the aid of FIG. 1 allows relatively satisfactory cohesion of electronic assembly 2. However, this electronic assembly requires several steps in its manufacturing method, in particular for arranging module 6 on substrate 8 and for establishing the electric connections between pads 10 and 11 of this module and pads 12 and 13 provided on substrate 8 onto which the two ends 19 and 20 of coil 4 are respectively bonded.

SUMMARY OF THE INVENTION

An object of the present invention is to provide an electronic device, including an electronic module and a coil electrically connected to this module, which is of simple and inexpensive design, while assuring in a reliable manner the cohesion of the electronic module and the coil.

The present invention thus concerns an electronic assembly formed by an electronic unit including two electric contact pads and by a coil both of whose ends are electrically connected to the two respective electric contact pads. This electronic contact pad is characterised in that the body of the coil is partially superposed onto each of the two electric contact pads, the coil and the electronic unit being fixed to each other by a solidified binder material provided on these two electric contact pads so that said coil body adheres to the two pads in a durable manner.

According to a particularly advantageous embodiment of the present invention, the electronic unit is formed by an electronic module and by two tongues, defining or supporting the aforementioned two electric contact pads, which extend outside the electronic module in a same plane.

It will be noted that the two tongues are arranged so that the coil body can be connected in a durable manner to these two tongues and that, together, the two ends of this coil can conveniently be bonded respectively onto the two electric contact pads.

As a result of the aforementioned features, the electronic assembly according to the invention does not include any distinct substrate and does not require any particular electric connection between the ends of the coil and the contact pads associated with the electronic module. Moreover, the electronic assembly according to the invention has excellent cohesion between the electronic module and the coil, which allows easy prehension or manipulation without the risk of damaging this electronic assembly, in particular the electric connection between the ends of the coil and the two electric contact pads associated with the electronic module.

BRIEF DESCRIPTION OF THE DRAWINGS

The present invention will be described in detail hereinafter with reference to the following figures, given by way of non-limiting examples, in which:

FIG. 3 is a partially enlarged view of FIG. 2;

FIG. 4 is a side view along the cross-sectional plane IV—IV of FIG. 3;

FIG. 5 is a top view, similar to FIG. 3, of a variant of the first embodiment;

FIG. 6 is a side view along the cross-sectional plane VI—VI of FIG. 5;

FIG. 7 is a partial schematic cross-sectional view of a first card including an electronic assembly according to the present invention, and FIG. 8 is a partial schematic cross-sectional view of a second card including an electronic assembly according to the invention.

DESCRIPTION OF THE INVENTION

Figure 1:
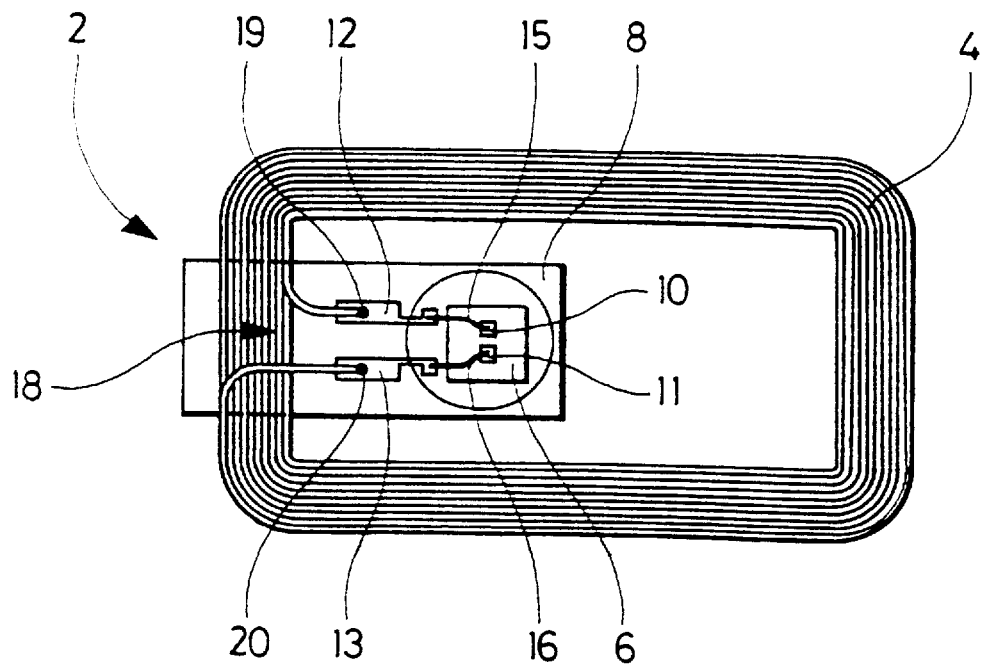
FIG. 1, already described, shows schematically a top view of an electronic assembly of the prior art.
Figure 2:
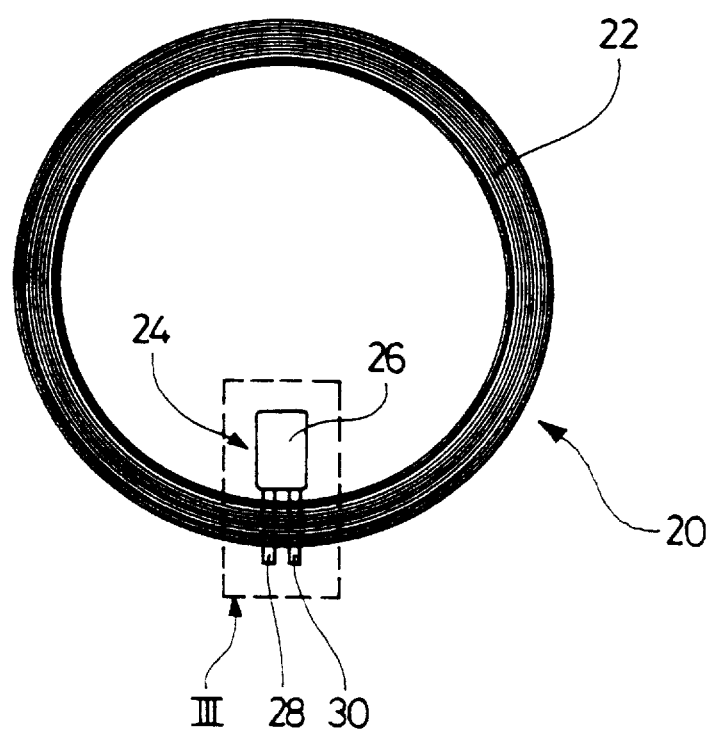
FIG. 2 is a schematic top view of an electronic assembly according to a first embodiment of the invention.

With reference to FIGS. 2 to 4, a first embodiment of an electronic assembly 20 according to the invention will be described hereinafter. This electronic assembly 20 includes a coil 22 and an electronic unit 24. This electronic unit 24 is formed by an electronic module 26 and two electrically conductive tongues 28 and 30 which extend from module 26. Conductive tongues 28 and 30 are formed by a metal or are respectively formed by two films having a surface metallisation. These tongues 28 and 30 define two electric contact pads of module 26.

Module 26 is formed, for example, of an integrated circuit placed in a package or embedded in an encapsulation material. The two conductive tongues 28 and 30 extend from module 26 at its median plane 32. In the variant shown in FIG. 4, tongues 28 and 30 have a fold defining a bend 34. This fold of tongues 28 and 30 allows the end portion 36 of each of them to be arranged substantially at the lower plane of module 26 defined by its lower surface 38.

Tongues 28 and 30 have sufficient length to allow body 40 of coil 22 to be arranged on said tongues 28 and 30, more particularly on their previously described end portion 36. Body 40 of coil 22 is fixed in a durable manner to tongues 28 and 30 by means of a solidified binder material (not shown), in particular by means of an adhesive material.

Given that the body of the coil is fixed to each of the two tongues, the module is rigidly fixed to the coil in a secure manner, which allows various manipulations of the assembly without any risk for the electric connections.

It will be noted that coil 22 is electrically insulated from the electric contact pads defined by conductive tongues 28 and 30 given that the wire forming the coil is itself insulated by an insulating coating provided for this purpose. Thus, body 40 of coil 22 which is superposed onto tongues 28 and 30 is electrically insulated from said tongues.

The two ends 42 and 43 of coil 22 are respectively bonded to tongues 28 and 30 so as to establish the electric connection between coil 22 and electronic module 26. It will be noted that in the variant proposed here, the two ends 42 and 43 of coil 22 are respectively bonded to the two end portions of tongues 28 and 30.

The method for manufacturing electronic assembly 20 described hereinbefore is as follows:

First electronic unit 24 is placed on an assembly device. Then, the coil is placed on the assembly device and said coil is fixed in a durable manner to tongues 28 and 30 by means of a binder material provided for this purpose. The two ends 42 and 43 of the coil are then placed on the ends of tongues 28 and 30 and bonded onto the latter by conventional means. Finally, in order properly to protect the electric connection between the coil and the conductive tongues, a drop of adhesive material 45 is placed on each bond performed for establishing the aforementioned electric connection. It is possible to provide a further step wherein the two ends 42 and 43 of coil 22 are cut beyond the bond.

It will be noted that in a variant of the embodiment described here, tongues 28 and 30 have no bend 34 and extend entirely in median plane 32 of electronic module 26.

With reference to FIGS. 5 and 6, a particular variant of the embodiment described hereinbefore will be described hereinafter.

The references which have already been described hereinbefore will not be described again here in detail.

The present variant differs essentially from the embodiment described hereinbefore first in that conductive tongues 28 and 30 extend in a lower plane 47 of electronic module 26, and secondly in that the two ends 42 and 43 of coil 22 are bonded respectively onto the two conductive tongues 28 and 30 on either side of the portion of body 40 of said coil 22 which is arranged on said two conductive tongues 28 and 30. This variant is advantageous in allowing an efficient assembly of the electronic assembly, namely in forming the coil after having bonded end 42 onto tongue 28, then bonding end 43 onto tongue 30 once the coil is formed.

It will be noted that, in the variant described in FIGS. 3 and 4 as well as in the variant described in FIGS. 5 and 6, the portion of body 40 which is superposed onto the two conductive tongues 28 and 30, onto which said body 40 is fixed by means of a binder material (not shown), is located facing the lateral surface 48 of module 26. Thus, electronic unit 24, the portion of body 40 of coil 22 located in the region of tongues 28 and 30 and the solidified drops of adhesive material have globally a minimum height and occupy relatively uniformly the region between the plane defined by lower face 38 of module 26 and the plane defined by upper face 50 of said module 26. This arrangement is particularly advantageous for the introduction of such an electronic unit within an electronic card or generally within a transceiver having a small thickness.

FIG. 7 shows schematically a first card 52 incorporating an electronic assembly 24 as described previously. Electronic assembly 24 is arranged between two layers 54 and 56 bonded to each other by conventional means known to those skilled in the art. The arrangement of electronic assembly 24 described hereinbefore allows cards of excellent quality to be obtained, in particular as regards the state of the lower and upper surfaces of such cards, for a relatively low manufacturing cost.

FIG. 8 shows a second card 58 of a different type to the previously described card 52. This card 58 includes two external layers 60 and 62 and an intermediate layer 64 formed by a binder material in which electronic assembly 24 according to the invention is embedded. Cards of this type can advantageously be obtained via a cold assembly technique.

What is claimed is:

1. An electronic assembly formed by an electronic unit and a coil, wherein said electronic unit is formed by an electronic module and by two electrically conductive tongues, extending from said electronic module and defining two electric contact pads of said electronic unit, said coil having two ends electrically connected to said two electric pads and a body partially superposed onto each of said two tongues, said body of said coil and said electronic unit being fixed in a durable manner to each other by a solidified binder material provided on said two tongues.

2. An electronic assembly according to claim 1, wherein said two tongues extend from said electronic module at the median plane of said electronic module.

3. An electronic assembly according to claim 1, wherein the portion of said two tongues, which is attached underneath to said body of said coil, extends in a lower plane of said electronic module, the portion of said coil body which is superposed onto said two tongues being located facing a lateral surface of said electronic module.

4. An electronic assembly according to claim 2, wherein the portion of said two tongues which is attached underneath to said body of said coil, extends in a lower plane of said electronic module, the portion of said coil body which is superposed onto said two tongues being located facing a lateral surface of said electronic module.

5. An electronic assembly according to claim 1, wherein the two ends of said coil are respectively bonded to said two electric contact pads on either side of said body of said coil.

6. An electronic assembly according to claim 2, wherein the two ends of said coil are respectively bonded to said two electric contact pads, on either side of said body of said coil.

7. An electronic assembly according to claim 3, wherein the two ends of said coil are respectively bonded to said two electric contact pads, on either side of said body of said coil.

8. An electronic assembly comprising an electronic unit and a coil, said coil comprising first and second ends and a coil body, said electronic unit comprising an electron ic module having two tongues projecting therefrom, said tongues defining first and second electric contact pads for connecting said coil to said electronic module, said first and second ends of said coil being electrically connected to said first and second electric contact pads, respectively, a portion of said coil body overlaying said tongues, and a solidified binder material securing said portion of said coil body to said first and second tongues, whereby said coil body is supported from said electronic module via said tongues.

9. An electronic assembly as claimed in claim 8 wherein said solidified binder material is an adhesive material.

10. An electronic assembly as claimed in claim 8 wherein said coil comprises a wire covered with an electrically insulating coating, whereby said portion of said coil body is electrically insulated from said electric contact pads.

11. An electronic assembly as claimed in claim 8, wherein said two tongues extend from said electronic module at a median plane of said electronic module.

12. An electronic assembly according to claim 8, wherein said electronic module has a median plane and each of said tongues has a lower portion extending in a plane lower than said median plane, said portion of said coil body overlaying the lower portions of said tongues so that said portion of said coil body overlaying the lower portions of said tongues faces a lateral surface of said electronic module.

13. An electronic assembly according to claim 8, wherein said first end of said coil is bonded to a first of said two electric contact pads at a first side of said coil body and said second end of said coil is bonded to a second of said two electric contact pads at a second side of said coil body opposite said first side.

* * * * *